May 17, 1955     L. A. ULMSCHNEIDER     2,708,648
METHOD OF SEALING EDGES OF WRAPPING MATERIAL
Original Filed Nov. 15, 1950     2 Sheets-Sheet 1
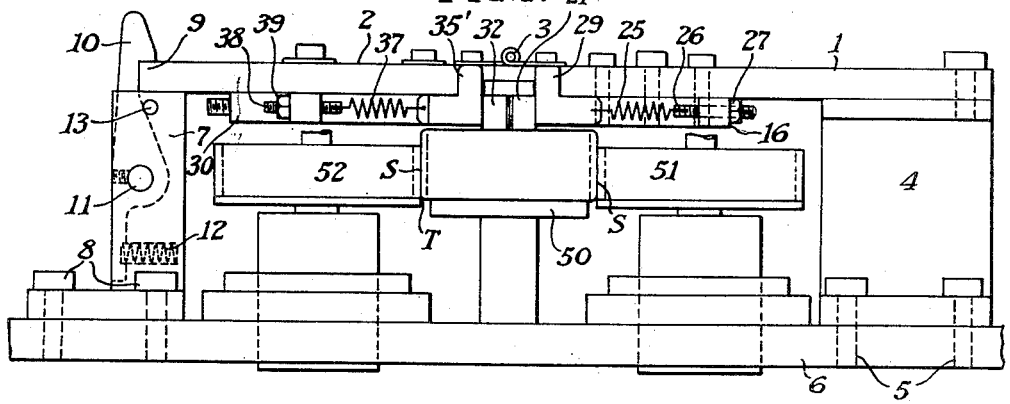
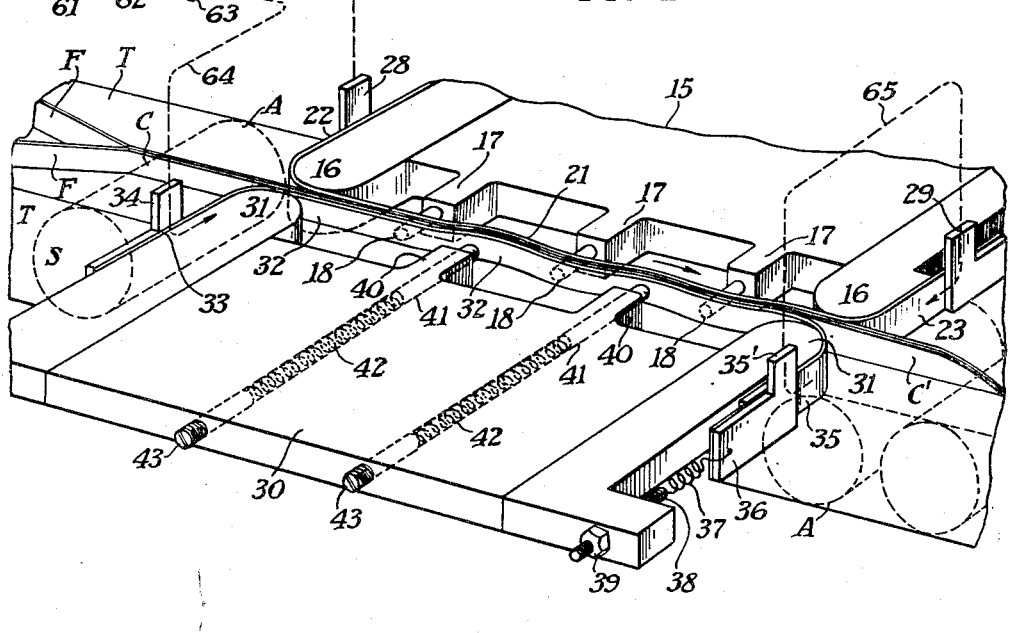
LAWRENCE A. ULMSCHNEIDER
Inventor May 17, 1955

L. A. ULMSCHNEIDER 2,708,648

METHOD OF SEALING EDGES OF WRAPPING MATERIAL

Original Filed Nov. 15, 1950

LAWRENCE A. ULMSCHNEIDER
Inventor

Daniel I. Mayne
Donald H. Stewart

By

Attorneys

United States Patent Office 2,708,648
Patented May 17, 1955

2,708,648

METHOD OF SEALING EDGES OF WRAPPING MATERIAL

Lawrence A. Ulmschneider, Rochester, N. Y., assignor to Eastman Kodak Company, Rochester, N. Y., a corporation of New Jersey Original application November 15, 1950, Serial No. 195,784, now Patent No. 2,629,808, dated February 24, 1953. Divided and this application December 8, 1951, Serial No. 260,715

4 Claims. (Cl. 154—116)

This invention relates to sealing facing edges of wrapping material which may consist of a support such as metal foil or paper having a thermoplastic coating on one side. Such wrapping materials are well known and the thermoplastic may be of a type which can be sealed by bringing the thermoplastic faces together and heating, with or without pressure. One object of my invention is to provide a sealing mechanism by which two edges of wrapping material may be sealed together, preferably in a continuous operation, by moving the wrapping material and the sealing means relative to each other. Another object of my invention is to provide a method and apparatus for sealing which will satisfactorily seal wrapping material, even though the wrapping material may be creased or bent so that it may not lie substantially in a plane. A still further object of my invention is to provide a sealing means in which a minimum amount of pressure is applied to the wrapping material as it passes between the heating elements of the sealing mechanism. A further object of my invention is to provide a sealing mechanism which will contact all of that part of the edges of the material which is to be sealed together. A still further object of my invention is to provide a method of sealing which may be carried out in various ways, but which insures the proper adherence of the desired area of the wrapping material. Other objects will appear from the following specification, the novel features being particularly pointed out in the claims at the end thereof.

This application is a division of my copending application for Method and Apparatus for Sealing Wrapping Material, Serial No. 195,784, filed November 15, 1950, now Patent 2,629,808, granted February 24, 1953.

Coming now to the drawings wherein like reference characters denote like parts throughout:

Fig. 1 is an end elevation of a sealing mechanism constructed in accordance with and embodying a preferred form of my invention;

Fig. 2 is a perspective view with certain parts omitted for clearness;

Figure 3:
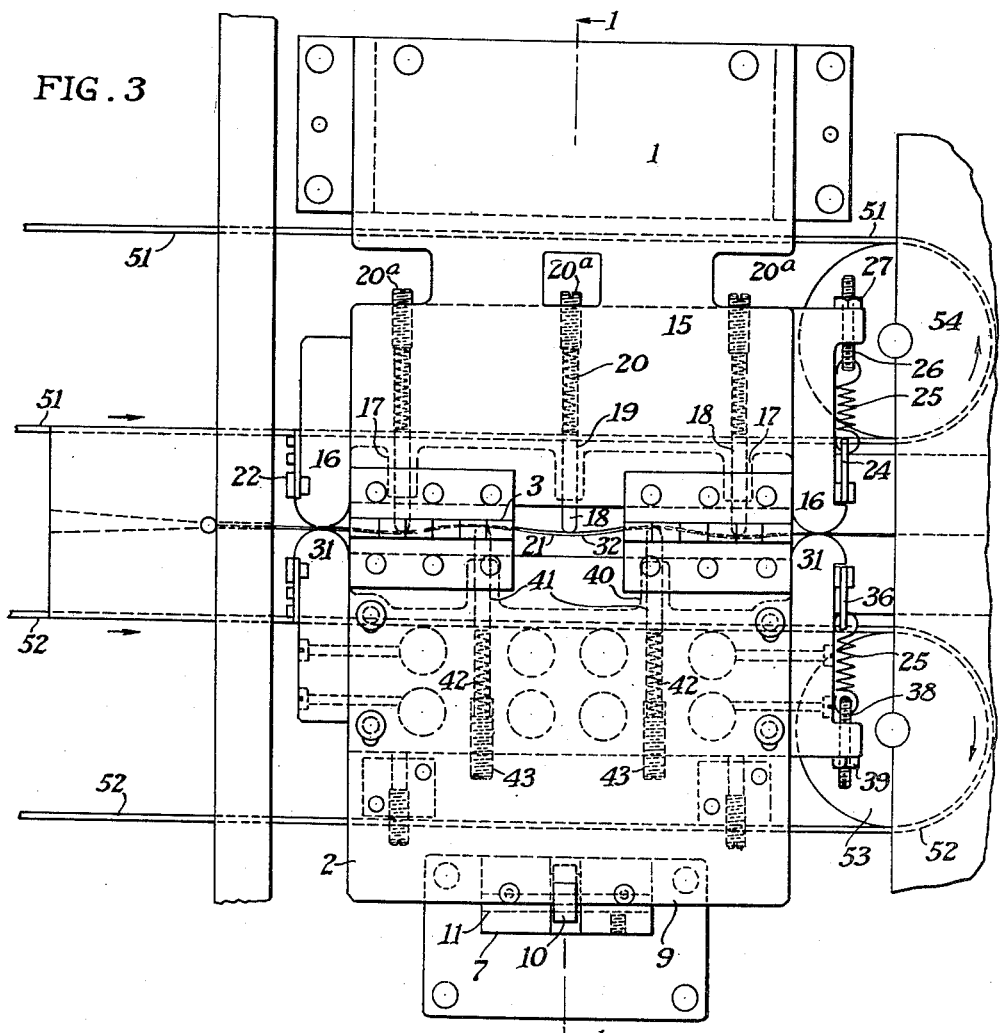
Fig. 3 is a top plan view of the sealing mechanism shown in the preceding figures.

The invention consists broadly in a method and apparatus for satisfactorily sealing two edges of wrapping material by heating plastic facing surfaces of the material to a point at which they will fuse together and adhere while holding the edges of said material lightly together, preferably passing the edges through a serpentine or wavy path. It has been found that after wrapping various articles, the edges of the wrapping material do not lie in a plane, but, to the contrary, they may have small folds, wrinkles, indentations, and the like, which prevent the two surfaces from lying smoothly in contact. Heretofore, sealing apparatus has ordinarily applied considerable pressure and has endeavored to iron out the irregularities in the surface of the wrapping material by smoothing devices, rollers, or the like, but such devices have not been entirely satisfactory because very often more pressure had to be applied to the material than the material could stand. In a continuous operation, such as may be carried out with my sealing device, it is preferable to move the material to be sealed at a relatively high rate of speed, such as, for instance, 40 feet per minute, and if varying pressure, or if a relatively heavy pressure, is applied to the edges, it is very difficult to bring the adhesive surfaces smoothly and fully into contact. My improved method consists in heating the material edges while moving these edges through a slightly wavy path in a heating zone, since I have found that such a path, by bending the material back and forth even though slightly, tends to smooth out the material, since it will normally lie flat transversely of each bend, so that by applying comparatively light pressure, the surfaces, if not in contact in passing around one bend, will be in contact in passing around another, and by raising the temperature to the desired degree they may be caused to adhere. At the same time the pressure actually applied to the wrapping material is so light that some up-and-down and even sideways motion is permitted between the edges of the material to be joined and the heating elements. It has been found in practice that extremely light pressure is desirable. I have also found that the serpentine path can be entirely satisfactory even though the deflection of this path from a straight line is extremely slight. It is to be understood that the embodiment shown in the drawings is only one preferred embodiment for accomplishing the desired result, and that other embodiments will readily suggest themselves to those skilled in the art.

As indicated in the drawings, the preferred embodiment consists of a sealing unit consisting of two sections, section 1 and section 2; these sections being hinged together at 3. Section 1 is carried by a support 4 which may be attached as by bolts 5 to a frame 6 of a machine, of which this sealing unit may form a part, and section 2 in its operative position shown in Fig. 1 may be latched on a post 7 attached as by bolts 8 to the frame 6. The outer end 9 of section 2 may be latched by latch member 10 pivotally mounted at 11 to the post 7 and having a spring 12 holding the latch in its operative position, or against the stop pin 13. On the underneath side of section 1 there is a positioning and sealing element 15 which may be fixedly mounted to section 1 in any suitable manner. The sealing element 15 may consist of a block of insulating material provided with two forwardly extending arms 16 which are mounted on the ends and, in this instance, three forwardly extending fingers 17, each of which carries an insulating pin 18, such as Pyrex glass. Pins 18 are preferably mounted as shown in Fig. 3 in apertures 19 in which they may slide, being pressed outwardly by light springs 20. Set screws 20a are provided for varying the tension on the springs. The forwardly extending arms 16 slidably support the heating elements 21 which may be conveniently made from a flexible Nichrome band, or other resistance material. This band has one end 22 immovably anchored on one side and the other end 23 attached to a slide member 24 so that a spring 25 anchored on member 15 on a set screw 26 may be used to take up the slack in the heating element 21 and provide a predetermined tension thereon. A nut 27 permits this tension to be adjusted as desired. Thus, the flexible heating element 21 is normally drawn taut by the spring 25, but under light pressure, and the pressure of the springs 20 is insufficient to overcome spring 25. If only one wrapping material is to be used, this adjustment may be omitted and both ends of the spring band may be immovably anchored.

A terminal 28 is provided on one end of the flexible heating element 21 and a terminal 29 is also attached to the other end of this heating element.

Figure 4:
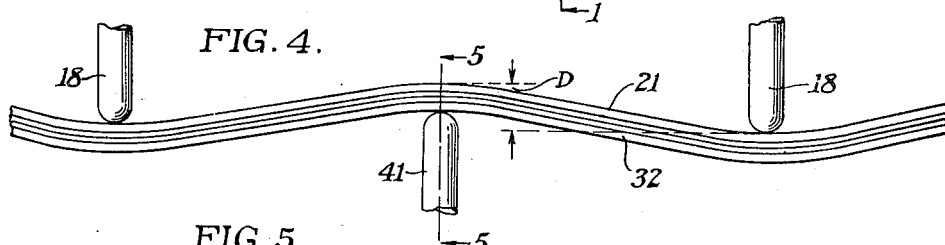
Fig. 4 is a fragmentary detail on a somewhat exaggerated scale illustrating a feature of my invention.
Figure 5:
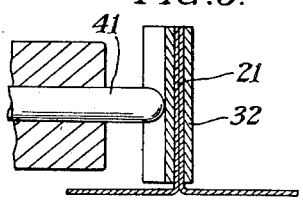
Fig. 5 is a section taken on line 5—5 of Fig. 4.

The hinged section 2 carries a similar sealing element 30, this element including rounded arms 31 about which a flexible resistance band 32 passes; one end 33 of this band being attached to a fixed terminal 34 and the other end 35 being attached to a slidable terminal 36 drawn by a spring 37 toward the outside of the heating element 30, thereby stretching the band 32 taut about the rounded ends 31 and under light pressure. A bolt 38 and nut 39 permits adjustment of this tension. The sealing member 30 likewise has fingers 40, two being shown in this case, projecting toward the fingers 17 but preferably lying midway between them. These fingers have slideways for insulating posts 41 which are pressed outwardly by light springs 42, the tension of which may be adjusted by set screws 43. When the two heating elements are in the position shown in Fig. 2, the Nichrome bands or heating elements 21 and 32 present a wavy path which is shown in exaggerated form in Fig. 4. In this figure, a pair of insulating pins 18 and one insulating post 41 are illustrated as contacting with the Nichrome bands 21, 32 to deflect these bands from a straight path by a distance D between each pair of posts. This distance is much less than illustrated, and it has been found that a deflection of, roughly, 1/16 of an inch is suitable for many materials, although, obviously, this distance may be increased or decreased by the setting of the springs 25, 26, 37, and 42 to properly take care of the particular wrapping material used.

I have found that a wrapping material consisting of an aluminum foil of .001" thickness may be coated on one side with a thin layer of 22 lb. plasticized paper of about .001" in thickness and the opposite side of the material may support a polyethylene layer of .0015" as the heat-sealing layer. With such materials, I have found that a wavy path in which the material is deflected between a 32nd and a 16th of an inch is entirely satisfactory, and, as the edges of the material are moved back and forth through the serpentine path, the entire edges of the material to be sealed are caused first to contact and then to adhere, even though the pressure is so light that it permits relative movement between the material and sealing bands to occur, at least to some slight degree, both transversely and longitudinally of the seam.

In Fig. 2, I have shown the sealing step being carried out to seal a tubular member which may be folded into rectangular shape by any of the well-known machines for accomplishing this result, such as in the manner shown in U. S. Patent No. 1,313,234, John G. Jones, Wrapping Process, August 12, 1919. Fig. 2 shows a tubular member T has been folded up with outwardly extending flanges F, it being understood that the heat-sealing plastic layer, such as polyethylene, lies inside of the flanges; these layers being brought into contact at C just before the tubular member bearing the wrapped articles A reaches the sealing position.

In the present instance, this tubular member T is moved along a table 50 by means of a pair of endless belts 51 and 52. These belts pass over pairs of rollers 53 and 54, best shown in Fig. 3, which are driven by any suitable mechanism at the same speed and in the direction shown by the arrows. The runs of the belt between the two sets of rollers (only one set being shown in Fig. 3) engage the side walls S of the folded tube T and move it at the desired speed. As the contacting upstanding flanges C reach the sealing elements 15 and 30, they engage the resilient Nichrome heating elements 21 and 32, and the upstanding flanges or edges of the material C are smoothed into contact as the edges C weave slightly back and forth in passing through the machine. By slightly bending the edges transversely of their direction of travel, any irregularities or departures from a plane are caused to smooth out, even though only light pressure is applied. As the plastic becomes warm, it softens and the two softened layers may move slightly relative to each other and into good adherence so that as the contacting edges C' leave the heating units, and the temperature of the heating elements is no longer present, the flanges adhere over that entire surface which is heated by the flexible bands. It has been found that such a seam is extremely tenacious and is completely waterproof, and, in addition, the seam may be made while the tube is traveling at a relatively high speed. In addition, I have found no tearing of the wrapping material in passing through this sealing device because of the light pressure which is applied, and because some movement of the contacting flanges C relative to the bands is permitted at all times.

It is, of course, not necessary that the material should move relative to the sealing means since comparatively short seals can obviously be made by moving the sealing member relative to the contacting surfaces of the wrapping material, and, of course, this method can be carried out in many ways. The distance between the members 18 and 41 and their spacing from each other does not appear to be at all critical and may be varied widely, and, in fact, all that is necessary is to deflect the resistance sealing bands from a straight path even to a slight degree. This, by causing the contacting edges to move back and forth in passing between the bands, smooths the material so the heat sealing plastic layers are brought into intimate contact while heated so that they firmly adhere.

As will be noticed in Fig. 2, where a circuit is schematically shown, the heating elements 21 and 32 are heated from a source of current 60—61 through a conductor 62, rheostat 63, and conductor 64 leading to terminal 34, through the Nichrome band 32, to terminal 35', through conductor 65, terminal 29, Nichrome band 21, and conductor 66. The temperature may be adjusted by the rheostat 63. I have found that with polyethylene and the wrapping material described above, a temperature of from 310 to 315 degrees Fahrenheit produces entirely satisfactory results. The necessary temperature may vary quite a little in accordance with the wrapping material as in cases where the paper layer is thicker, a higher heat may be required, and if the paper layer is omitted, the heat may be slightly reduced. If the aluminum is thicker, a much higher heat due to the conductivity of the aluminum, is required. Different materials may therefore require heat adjustments. Where it is not so essential to provide complete waterproofing, material may be used which is less expensive and which may omit, for instance, the metal foil layer which, however, is preferable for a moisture-proof package. Whether the material is paper, foil, or foil and paper, the method is the same in that the contacting edge surfaces to be joined are passed through a wavy path so as to flatten out and bring into contact small irregularities in the surface of the sheet to be contacted.

While I have shown a preferred form of my invention, and one which is well adapted to achieving the objects of this invention, it is to be understood that this is not to be considered in a limiting sense. Various possible embodiments can readily be made and will suggest themselves to those skilled in the art, so that the embodiments disclosed herein should be taken as illustrative and not in a limiting sense.

Having thus described my invention, what I claim is new and desire to secure by Letters Patent of the United States is:

1. The method of forming a seal between two portions of wrapping material comprising a support having a heat-sealing plastic layer on one side, comprising the steps of contacting areas of the plastic layers while passing the contacting areas through a heating zone of limited width, said contacting areas being passed through a path of wavy form while moving through the heating zone, the areas to be adhered being caused to lie one against the other through the heating zone to smooth said areas into intimate contact while passing through the heating zone and applying light pressure to press the heated plastic layers smoothly together in moving through the heating zone, and finally moving the adhered areas from the heated zone.

2. The method of forming a longitudinal seal between portions of wrapping material comprising a support having a heat-sealing plastic layer on one side, comprising the steps of contacting longitudinal areas of the plastic layers to be joined while moving the wrapping material through a longitudinal path including a heating zone of limited width, moving the areas to be joined laterally back and forth while in the heating zone to cause a slight rubbing action of one heated plastic area relative to the other as the areas to be joined move through their longitudinal path to cause intimate surface contact of the heated plastic areas, and moving the areas which are thus united from the heated zone.

3. The method of forming a longitudinal seal between portions of wrapping material comprising a support having a heat-sealing plastic layer on one side, comprising the steps of bringing the areas to be joined in parallel relationship with the heat-sealing areas in facing relationship, moving the positioned areas to be joined through a longitudinal path having a wavy shape and constituting a heating zone, moving the facing areas through the heating zone while moving the facing areas back and forth longitudinally and transversely from their parallel relationship a distance to cause one heat-sealing area to lightly rub over the other as the areas are heated and moved, and lightly pressing the areas to be joined into intimate contact to adhere the longitudinally and transversely moving areas together, and finally moving the sealed areas from the heated zone.

4. The method of forming a longitudinal seal between two portions of wrapping material comprising a support having a heat-sealing plastic layer on one side, comprising the steps of contacting areas of the plastic layers to be sealed while moving the layers through a heating zone, said contact being obtained by passing the layers back and forth in a slightly wavy path deviating from a straight line while lying in the heating zone, applying light pressure on the areas to be sealed as the areas are moved through their wavy path in the heating zone, thus ironing out nonplane areas of the parts to be sealed, said heating zone applying heat to soften the plastic layers so the softened layers may be moved one against the other under the light pressure on the areas to be sealed, and moving the adhered areas from the heated zone.

References Cited in the file of this patent

UNITED STATES PATENTS

| Number | Name | Date |
|---|---|---|
| 2,429,177 | Young | Oct. 14, 1947 |
| 2,460,460 | Langer | Feb. 1, 1949 |
| 2,486,759 | Pfeiffer | Nov. 1, 1949 |
| 2,490,111 | Whitehead | Dec. 6, 1949 |
| 2,490,946 | Cloud | Dec. 13, 1949 |
| 2,594,229 | Snyder et al. | Apr. 22, 1952 |

FOREIGN PATENTS

| 117,146 | Australia | June 21, 1943 |